United States Patent [19]

Johann

[11] Patent Number: 4,498,683
[45] Date of Patent: Feb. 12, 1985

[54] STEERABLE CARRIAGE FOR A SAILBOAT

[76] Inventor: James R. Johann, 593 High Knoll Dr., Cedarburg, Wis. 53012

[21] Appl. No.: 478,706

[22] Filed: Mar. 25, 1983

[51] Int. Cl.³ .............................................. B62B 15/00
[52] U.S. Cl. .......................................... 280/16; 114/43
[58] Field of Search ...................... 280/7.1, 7.12, 7.14, 280/16, 47.13 B, 414.2; 180/2.2; 114/39, 43

[56] References Cited

U.S. PATENT DOCUMENTS

| | | | |
|---|---|---|---|
| 3,051,503 | 8/1962 | Halperin | 280/16 |
| 3,572,740 | 3/1971 | Rypinski | 280/16 |
| 3,779,573 | 12/1973 | Gullberg et al. | 280/16 |
| 4,061,100 | 12/1977 | Muhlfeld | 114/43 |
| 4,087,104 | 5/1978 | Winchell et al. | 280/16 |

FOREIGN PATENT DOCUMENTS 730452  3/1966  Canada .................................. 114/43

Primary Examiner—Joseph F. Peters, Jr.
Assistant Examiner—Ross Weaver

[57] ABSTRACT

A steerable carriage for supporting a sailboat such that the sailboat can be operated on land, snow or ice and thereby permitting sailboat owners to use their sailboats throughout the year regardless of the weather conditions.

11 Claims, 6 Drawing Figures

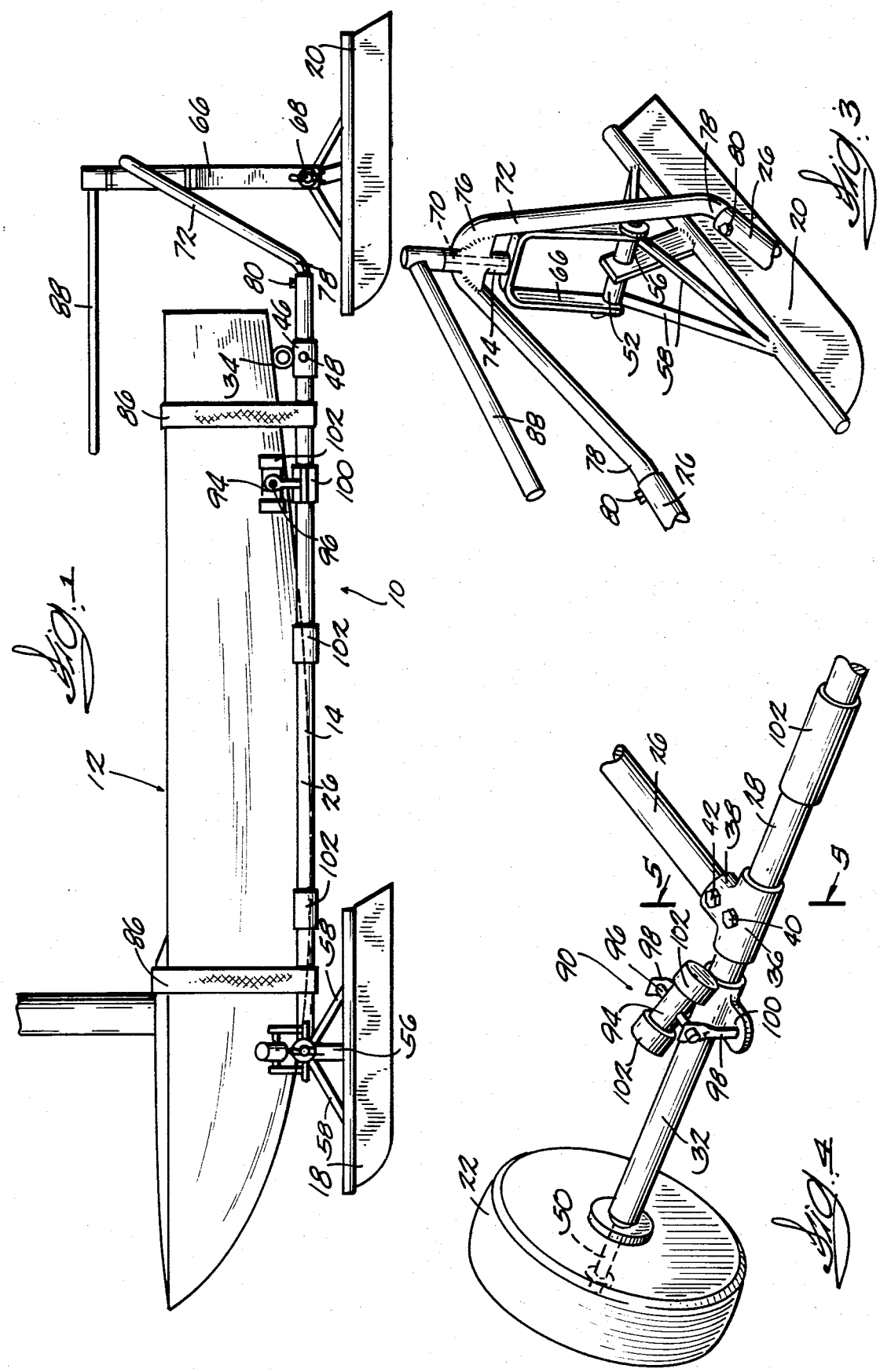

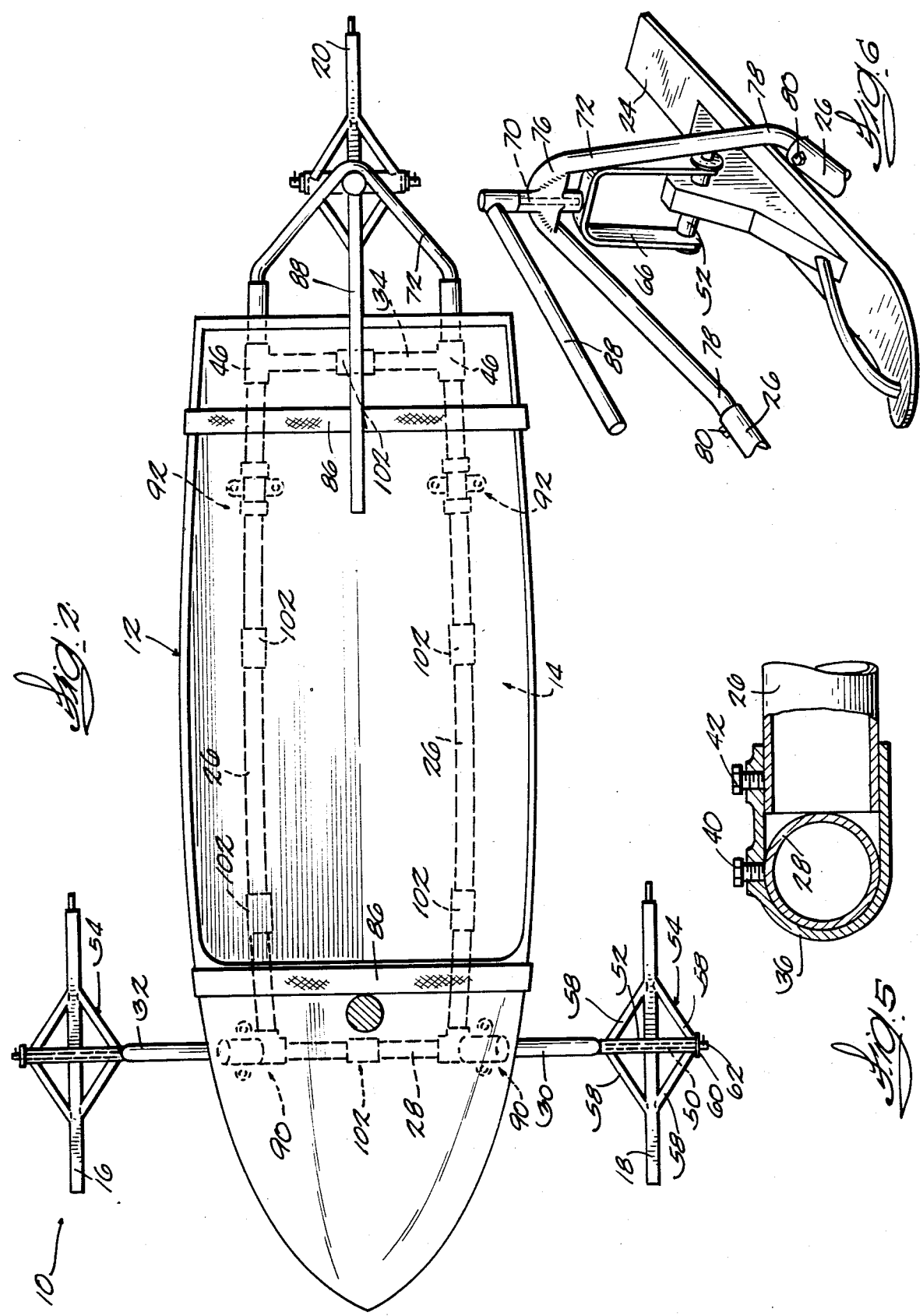

4,498,683

STEERABLE CARRIAGE FOR A SAILBOAT

The present invention relates to apparatus for use in supporting sailboats so as to permit operation of the sailboat on land or on ice.

BACKGROUND PRIOR ART

In many areas of the U.S. and particularly in Northern climates, sailboats can be used only in the summer months. In the winter, ice or cold water bars the use of the sailboat and the sailboat enthusiast must await warmer weather.

Some sailing enthusiasts enjoy their hobby by switching to iceboating, but this requires the purchase of an iceboat at substantial additional expense. Additionally, sailboats and iceboats have substantially different sailing characteristics, and for many sailing enthusiasts, iceboating is not a satisfactory substitute.

Attention is also directed to the Fletcher U.S. Pat. No. 2,238,464, issued Apr. 15, 1941 and the Noland U.S. Pat. No. 3,436,087, issued Apr. 1, 1969 illustrating prior art devices intended to function as convertible sailing vessels.

Attention is also directed to the Engnell U.S. Pat. No. 2,966,368, issued Dec. 27, 1960; the Foschino U.S. Pat. No. 3,567,241, issued Mar. 2, 1971 and the Tuggle U.S. Pat. No. 4,327,933, issued May 4, 1982.

None of these of the devices illustrated in these references provide an apparatus which permits operation of a sailboat on land, snow or on ice to thereby permit use of a sailboat even during inclement weather.

SUMMARY OF THE INVENTION

The invention provides a steerable carriage for supporting a sailboat such that the sailboat can be operated on land, snow or ice and thereby permitting sailboat owners to use their sailboats throughout the year regardless of the weather conditions.

The steerable carriage embodying the invention includes a frame shaped so as to be particularly adapted to support the sailboat, and the frame being supported on wheels, skis, or runners, such that the steerable carriage can be used on flat ground, ice or snow. The frame is particularly constructed so as to be steerable in the same manner as a sailboat is steerable in the water. The steerable carriage thus provides the sailor with the same action that is achieved when the sailboat is in water and permits the sailor to practice sailing or enjoy sailing during those times when he cannot put his sailboat into the water.

Referring more particularly to the construction of the steerable carriage, the frame includes a steerable ground engaging member, such as a wheel, ski, or runner intended to be located directly under the rearward end of the sailboat. This ground engaging member is supported for pivotable movement about a generally vertical axis located in the same position as the axis of pivotable movement of the sailboat rudder. A tiller is connected to the steerable ground engaging member to provide for steering movement. The frame also includes a pair of wheels, skis, or runners positioned on opposite sides of a forward portion of the sailboat and adapted to support the bow of the sailboat. The frame is also constructed so as to cradle the sailboat in such a manner as to prevent the sailboat from sliding off of the carriage. The frame is also constructed so as to provide flexible support for the sailboat such that the frame will absorb shocks or bumps as the sailboat moves along the ground or ice.

The carriage embodying the invention is also constructed such that it can be easily assembled and disassembled for storage, and the frame is adjustable in size and configuration so as to facilitate use of the carriage with a wide range of sizes and styles of small sailboats.

The carriage is also relatively simple or uncomplicated in construction and includes only a relatively few number of parts of lightweight materials.

Various features and advantages of the steerable sailboat carriage embodying the invention will be apparent by reference to the following description of a preferred embodiment, from the drawings, and from the claims.

BRIEF DESCRIPTION OF THE DRAWINGS

FIG. 1 is a side elevation view of a steerable carriage embodying the invention and shown as supporting a sailboat.

FIG. 2 is a plan view of the steerable carriage and sailboat illustrated in FIG. 1.

FIG. 3 is an enlarged perspective view of a rearward portion of the steerable carriage illustrated in FIG. 1.

FIG. 4 is an enlarged perspective view of a portion of the forward frame assembly of the steerable carriage illustrated in FIG. 1 and also showing the carriage being supported for movement on wheels rather than on runners.

FIG. 5 is a cross-section view taken along line 5—5 in FIG. 4.

FIG. 6 is a view similar to FIG. 3 but showing the steerable carriage as being supported by a ski rather than by a runner.

Before describing a preferred embodiment of the invention in detail, it is to be understood that the invention is not limited in its application to the details of construction nor to the arrangement of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF A PREFERRED EMBODIMENT

Illustrated in FIGS. 1 and 2 is a steerable carriage 10 embodying the invention and shown as supporting a small sailboat 12. The steerable carriage 10 is generally comprised of a frame 14 supported for movement by a plurality of ground engaging members 16, 18, and 20. In the embodiments of the invention shown in FIGS. 1-3, the ground engaging members 16, 18 and 20 are shown as comprising runners adapted to support the carriage 10 on ice. FIG. 4 shows an alternative embodiment of the invention wherein the runners are replaced by wheels 22. FIG. 6 shows another alternative embodiment wherein the runners are replaced by skis 24 so as to permit the carriage 10 to be operated on snow. The frame 14 is comprised of a pair of generally parallel spaced longitudinally extending frame members 26, the frame members 26 extending parallel to the longitudinal axis of the boat 12. The longitudinal frame members 26 are intended to be positioned beneath the sailboat 12 and on opposite sides of the center line of the sailboat 12 so as to cradle the sailboat.

The frame also includes a forward frame member 28 extending perpendicularly to the longitudinal frame members 26 and joined to their forward ends. In the illustrated construction of the invention, the opposite ends 30 and 32 of the forward frame member 28 extend outwardly beyond the longitudinally extending frame members 26, these outwardly extending ends of the frame member 28 being adapted to be supported by the ground engaging members 16 and 18.

Means are also provided for joining the forward transverse frame member 28 to the forward ends of the elongated frame members 26 and for permitting adjustable movement of the forward ends of the elongated frame members 26 toward and away from each other. While various means could be provided for joining these frame members 26 and 28 together, in the illustrated construction a pair of sleeves 36 surround the forward frame member 28 so as to be selectively slideable along the length of the forward frame member 28. The sleeves 36 each include an intersecting portion 38 comprising a socket adapted to house the forward end of one of the elongated frame members 26. As shown in FIGS. 4 and 5, a set screw 40 is provided to permit adjustment of the position of the sleeve 36 along the length of the forward frame member 28, and a second set screw 42 is provided for fixing the forward end of the elongated frame member 26 in the socket 38. The frame 14 also includes a rearward transverse frame member 34 fixed to the rearward ends of the elongated longitudinally extending frame members 26 and supporting the rearward ends in spaced apart relation.

Means are further provided for joining the rearward ends of the elongated frame members 26 to the rearward transverse frame member 34 such that the rearward transverse frame member 34 is adjustably moveable along at least a portion of the length of the elongated frame members 26. More particularly, the opposite ends of the rearward transverse member 34 are fixedly mounted on sleeves 46 adapted to surround the rearward ends of the elongated longitudinally extending members of the frame 26. Set screws 48 are provided to releasably join the sleeves 46 to the rearward ends of the elongated frame members 26 and to permit slideable adjustable movement of the rearward transverse member 34 along the length of the longitudinally extending frame members 26. Since the forward ends of the elongated frame members can be separated and moved toward and away from each other by loosening the set screws 40 and since the rearward frame member 34 can be moved forwardly and rearwardly with respect to these longitudinally extending frame members 26, the size of the carriage 14 can be adjusted so as to support sailboats 12 of various lengths and widths.

Means are also provided for joining the ground supporting members 16 and 18 to the opposite ends 32 and 30 of the forward transverse frame member 28. As previously stated, the ground supporting members 16 and 18 are shown in FIGS. 1–3 as comprising runners or blades adapted to support the carriage 14 for movement along the ground. The opposite ends of the forward frame member 28 each include a pivot shaft 50 extending axially outwardly therefrom. A sleeve 52 surrounds the pivot shaft 50 so as to be supported thereon for pivotable movement around the axis of the pivot shaft 50. A frame 54 is provided for fixedly joining the blade 16 or 18 to the sleeve 52. While this frame 54 could have various constructions, in the illustrated arrangement it includes a generally vertically extending bar 56 (FIG. 1) and a plurality of rigid struts 58 welded to the blade or runner 16 or 18 and to the sleeve 52 so as to provide a rigid structure. In the illustrated construction, the sleeve 52 is held on the pivot shaft by a washer 60 and a pin 62 releaseably housed in a bore in the end of the pivot shaft.

Means are also provided for pivotably joining the ground supporting member 20 to a rearward portion of the frame 14. In the illustrated embodiment, the ground supporting member 20 supporting the rearward end of the frame 14 will have the same configuration as those supporting the opposite ends 30 and 32 of the forward transverse frame member 28. While the means for pivotably joining the ground support member 20 to the frame 14 could have other configurations, in the illustrated arrangement, the means for pivotably supporting includes a yoke 66 supporting a pivot shaft 68, the pivot shaft 68 being adapted, in turn, to support sleeve 52 of the ground supporting member. A generally vertical pivot shaft 70 extends upwardly from an upper end of the yoke 66 and is fixed to the yoke 66. The means for pivotably joining the ground supporting member to a rearward portion of the frame also includes an inverted generally V-shaped frame 72. A sleeve 74 is welded to the apex 76 of the V-shaped frame 72 and is adapted to house the pivot shaft 70 for pivotable movement upon its axis. The lower ends 78 of the V-shaped frame 72 are bent so as to extend forwardly and are adapted to be slideably insertable into the rearward ends of respective ones of the elongated longitudinally extending frame members 26. Means can also be provided for selectively releasably restraining the ends 78 of the V-shaped frame 72 in the ends of a longitudinally extending frame members 26. In one form of the invention, set screws 80 can extend through threaded bores in the ends of the longitudinally extending frame members 26 so as to engage the ends 78 of the V-shaped frame member.

While various means can be provided for securing the sailboat to the carriage 10, in the illustrated arrangement conventional rachet straps 86 can be used to secure the bow and stern of the sailboat to forward and rearward portions of the carriage 10.

One of the features of the invention is that by providing a steerable ground engaging member 20 at a rearward portion of the boat 12 and by properly locating the forward ground engaging members 16 and 18 with respect to the boat, the sailboat supported by the steerable carriage will have the same handling characteristics as a sailboat in water. The tiller 88 of the sailboat can be connected to the steerable ground engaging member 20, and movement of the tiller 88 will have substantially the same effect on the sailboat as when the tiller 88 is connected to a rudder and the sailboat is operated in water.

The steerable carriage 10 also includes a first pair of support members 90 supported by a forward end of the frame 14 and adapted to support opposite sides of the forward portion of the sailboat 12. A second pair of support members 92 is supported by a rearward end of the frame 14, and these rear support members 92 are adapted to be positioned beneath and on opposite sides of the stern of the sailboat. While in other arrangements the support members 90 and 92 could have other constructions, in the illustrated embodiment, the support members 90 and 92 each comprise a generally cylindrical member 94 (FIG. 4) supported by a trunnion arrangement with the trunnion being supported by the frame 14. Referring to FIG. 4, the support member 90 shown there includes a cylindrical member 94 supported by a pivot shaft 96 for pivotable movement about the axis of the pivot shaft, the pivot shaft 96 being supported at its opposite ends by a pair of vertical support members 98 in turn supported by a bracket 100 fixed to the forward transverse frame member 28. Similarly, the second pair of support members 92 (FIG. 1) each comprise a cylinder 94 supported by a pivot shaft 96, the shaft 96 in turn being supported by a bracket 100 fixed to the rearward ends of the longitudinally extending frame members 26.

In a preferred form of the invention, portions of the frame members 26, 28 and 30 and the opposite ends of each of the support members 94 are wrapped with a flexible padding material 102. In the illustrated construction, each of the areas of the frame 14 intended to support a portion of the boat is wrapped with the flexible padding material 102, so as to provide a cushioned support for the boat. This flexible padding material can comprise a rubber or foam material including adhesive on one surface so that when wrapped around the frame members, it will adhere to the frame members.

In a preferred form of the invention, the elongated frame members 26 and the forward and rearward frame members 28 and 34 will be comprised of aluminum aircraft tubing. This material provides a light-weight frame which is easily transported and stored. The light-weight aluminum tubing also provides for flexibility in the frame 14 so as to provide means for cushioning the boat.

Another of the principal features of the invention is that the frame members 26, 28 and 30 are easily joined together and taken apart. The rearward frame 72 can also be easily joined to the elongated frame members 26, and the ground engaging members are readily mounted and removed. Accordingly, the carriage can be sold in a kit form for assembly by the purchaser, and it is also conveniently disassembled for storage.

Various features of the invention are set forth in the following claims.

I claim:

1. A carriage for supporting a sailboat such that the sailboat can be operated on land or on ice, the carriage comprising:
a frame including
a pair of generally spaced apart elongated structural members adapted to extend along opposite sides of a sailboat, said elongated structural members being adapted to be positioned under the sailboat with one of said elongated structural members positioned under one side of said sailboat and with the other of said elongated structural members positioned under the other side of said sailboat and to support the sailboat thereon, and with a portion of said sailboat cradled between said elongated structural members and extending downwardly between said elongated structural members, the elongated structural members being parallel to the center line of the sailboat and each including forward ends adapted to support the bow of the sailboat and rearward ends adapted to support the stern, and
a forward frame member extending transversely to said parallel elongated structural members and connecting said forward ends of said elongated structural members, said forward frame member including opposite ends, and said forward frame member being adapted to be positioned beneath the bow of the sailboat so as to support the bow,
said frame defined by said elongated structural members and said forward frame member being resilient and flexible so as to be adapted to resiliently support the sailboat for movement of a sailboat in water,
a first ground engaging member supporting one of said opposite ends of said forward frame member,
a second ground engaging member supporting the other of said opposite ends of said forward frame member, and
a pivotable ground engaging member for supporting the stern of the sailboat, said pivotable ground engaging member supporting the rearward ends of said elongated structural members.

2. A carriage as set forth in claim 1 wherein said elongated structural members are comprised of elongated flexible aluminum tubes.

3. A carriage as set forth in claim 1 and further including means for releasably joining the forward ends of said elongated structural members to said forward frame member.

4. A carriage as set forth in claim 3 wherein said means for releasably joining includes means for supporting said forward ends of said elongated structural members for adjustable slidable movement toward and away from each other on said forward frame member.

5. A carriage as set forth in claim 1 wherein said forward frame members are of sufficient length that said opposite ends extend outwardly beyond the sides of a sailboat supported on the carriage.

6. A carriage as set forth in claim 1 and further including means for pivotably connecting the pivotable ground engaging member to the rearward ends of said elongated structural members, said means for pivotably connecting including means for supporting said ground engaging member for pivotable movement about a generally vertical axis.

7. A carriage as set forth in claim 6 wherein said means for pivotably connecting includes a frame member having opposite ends, one of said opposite ends being joined to a rearward end of one of said elongated support members and the other of said opposite ends of said frame member being joined to a rearward end of the other of said elongated support members.

8. A carriage as set forth in claim 7 wherein said means for pivotably connecting further includes a sleeve fixed to said frame, said sleeve having a generally vertical longitudinal axis, a shaft housed in said sleeve for rotation about said longitudinal axis, said pivotable ground engaging member being connected to a lower end of said shaft housed in said sleeve, and said shaft housed in said sleeve including an upper end, and a tiller connected to said upper end.

9. A carriage as set forth in claim 1 wherein said ground engaging members comprise runners adapted to support the carriage for movement over ice.

10. A carriage as set forth in claim 1 wherein said ground engaging members comprise wheels.

11. A carriage as set forth in claim 1 wherein said ground engaging members comprise skis.

* * * * *